United States Patent [19]
Campion

[11] Patent Number: 6,047,568
[45] Date of Patent: Apr. 11, 2000

[54] METHOD OF MANUFACTURING A SILICA POWDER AND USE OF SUCH A POWDER IN MAKING AN OPTICAL FIBER PREFORM

[75] Inventor: Jean-Florent Campion, Arpajon, France

[73] Assignee: Alcatel N.V., Amsterdam

[21] Appl. No.: 08/852,061

[22] Filed: May 6, 1997

Related U.S. Application Data

[63] Continuation of application No. 08/466,185, Jun. 6, 1995, abandoned, which is a continuation of application No. 08/087,060, Jul. 7, 1993, abandoned.

[30] Foreign Application Priority Data

Jul. 7, 1992 [FR] France .................................. 92 08369

[51] Int. Cl.$^7$ ................................................ C03B 37/016
[52] U.S. Cl. ............................... 65/395; 65/391; 65/397; 65/17.2; 423/338
[58] Field of Search ............................. 65/391, 395, 404, 65/426, 17.2, 17.3, 397; 501/12; 423/338

[56] References Cited

U.S. PATENT DOCUMENTS

| | | | |
|---|---|---|---|
| 3,954,431 | 5/1976 | Fleming, Jr. et al. | 65/18.1 |
| 4,042,361 | 8/1977 | Bihuniak et al. | 65/18.1 |
| 4,200,445 | 4/1980 | Bihuniak | 65/21.5 |
| 4,402,720 | 9/1983 | Edahiro | 65/397 |
| 4,549,891 | 10/1985 | Plummer . | |
| 4,605,428 | 8/1986 | Johnson et al. | 65/18.1 X |
| 4,689,212 | 8/1987 | Mansfield . | |
| 4,726,828 | 2/1988 | Clasen | 65/18.1 |
| 4,767,429 | 8/1988 | Fleming et al. | 65/3.11 |
| 4,840,653 | 6/1989 | Rabinovich | 65/3.12 |
| 4,872,895 | 10/1989 | Fleming | 65/21.5 |
| 4,935,045 | 6/1990 | Yamauchi et al. . | |
| 5,028,247 | 7/1991 | Asami | 65/17.2 |
| 5,063,179 | 11/1991 | Menashi | 423/338 |
| 5,154,745 | 10/1992 | Le Sergent . | |
| 5,522,007 | 5/1996 | Drouart et al. . | |
| 5,562,752 | 10/1996 | Fleming | 423/338 |
| 5,643,347 | 7/1997 | Wendecker | 65/17.3 |

FOREIGN PATENT DOCUMENTS

| | | |
|---|---|---|
| 0272281 | 6/1988 | European Pat. Off. . |
| 2103202 | 2/1983 | United Kingdom . |
| 2229715 | 10/1990 | United Kingdom . |

OTHER PUBLICATIONS

Clausen, Preparation of high–Purity silica glasstubes by centrifugal casting of colloidal gels, Journal of Materials Science Letters, 7 (1988), 477–478.

Clausen, R, Preparation and Sintering of High–Density Green Bodies to High–Purity Silica Glass, Journal of Non––Crystalline Solids, 89 (1987) 335–344, Dec. 1987.

Rabinovich, E.M. et al "Preparation of High–Silica Galsses from Colloidal Gels . . . Glasses", *Journal of the American Ceramic Society*, vol. 66, No. 10, Oct. 1983, Columbus US, pp. 683–688.

Database WPIL, Section cH, Week 05, 1983 Derwent Publications Ltd, London, GB; Class L01, AN 83–10489K & JP–A–57 205 334 (NT&T) Dec. 16, 1982.

French Search Report FR 9208369 dated Mar. 22, 1993.

*Primary Examiner*—John Hoffmann
*Attorney, Agent, or Firm*—Sughrue, Mion, Zinn, Macpeak & Seas, PLLC

[57] ABSTRACT

A method of manufacturing a silica powder using a sol-gel technique, wherein a suspension consisting of synthetic silica soot, having a specific surface area of less than 80 $m^2/g$, is made in water to form a concentration of 50% to 75% by weight of silica; the suspension is gelled; the resulting gel is dried without forming a crust and with microwaves and broken up into silica grains having an apparent density of 0.5 $g/cm^3$ to 0.6 $g/cm^3$; and screening of the dry gel is performed to provide grains having a desired size.

9 Claims, 1 Drawing Sheet

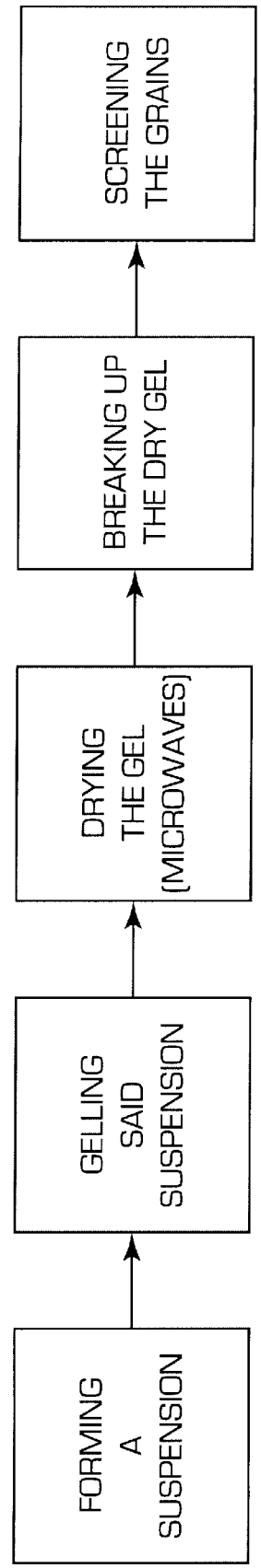
FIGURE

METHOD OF MANUFACTURING A SILICA POWDER AND USE OF SUCH A POWDER IN MAKING AN OPTICAL FIBER PREFORM

This is a Continuation of application Ser. No. 08/466,185 filed Jun. 6, 1995, now abandoned, which is a Continuation Application of application Ser. No. 08/087,060 filed Jul. 7, 1993, now abandoned.

The present invention relates to a method of manufacturing a silica powder for use more particularly but not exclusively in making an optical fiber preform.

BACKGROUND OF THE INVENTION

The invention relates essentially to the POD method, i.e. a technique of plasma deposition by spraying and melting a silica powder on a primary preform. That method is described, for example, in the article by Le Sergent et al. entitled "Preform technologies for optical fibers" published in Electrical Communication, Vol. 62, No. 3/4, 1988, page 238.

Until now, the silica powders in use have been of two types.

The first type is a natural quartz powder of satisfactory grain size, but that may present random inclusions that are liable to make the subsequent preform fragile.

The second type is a synthetic powder or soot having a high degree of purity but in which the grains are so small (grain diameter less than 100 nm), that use thereof makes the POD method too lengthy and too expensive. The term "synthetic silica soot" is used below to designate this second type of powder. Such a soot may be obtained, for example, by an MCVD method; it may also be pyrogenic, like the soot sold under the name Aerosil OX-50 and 200 by Degussa.

European patent application EP-A-0 271 281 also describes a sol-gel method for making a silica powder for an optical fiber preform. That method consists in dispersing synthetic soot having a specific area of 200 square meters per gram ($m^2/g$) to a concentration of 25% by weight. The resulting gel is fractioned by mechanical means and the resulting grains are dried. It is observed that the grains are extremely friable, thereby making any subsequent screening operation difficult.

OBJECTS AND SUMMARY OF THE INVENTION

An object of the present invention is to avoid that drawback and to propose a sol-gel method that gives rise to silica grains that are not very friable, having grain size and purity that are well suited to the POD method.

The present invention provides a method of manufacturing a silica powder by a sol-gel technique, wherein:
 a suspension of synthetic silica soot having a specific area of less than 80 $m^2fc/g$ is made in water to a concentration of 50% to 75% by weight of silica;
 the said suspension is gelled
 the resulting gel is dried under microwaves;
 the dry gel is broken up into grains of silica of diameter lying in the range 10 $\mu m$ to 1 mm and having an apparent density of about 0.5 $g/cm^3$ to 0.6 $g/cm^3$; and
 screening is performed between 100 $\mu m$ and 500 $\mu m$.

The silica of the gel is transparent to microwaves at the drying temperature. The gel is dried in bulk, without any kind of crust forming. After mechanical separation, the resulting grains are not very fragile and they withstand subsequent screening without breaking up.

In a particular implementation, the gelling is performed by heating said suspension to about 40° C., the resulting gel being dried under a vacuum in a microwave oven, and being broken up by grinding using Teflon balls or by cutting up using a helical screw.

The porous grains obtained by the method of the invention can be used directly in the plasma torch of the POD method.

Preferably, the grains are sprayed simultaneously with a fluorine-containing gas, e.g. of the $SF_6$ type; the flow rate of the gas may be adjusted so that the percentage (by weight) of fluorine incorporated in the silica lies in the range 0.3% to 1.5%.

Various dopants for modifying the refractive index and the mechanical properties of the subsequent preform may be added to the suspension as oxides or soluble salts in powder form; these dopants (titanium, magnesium, calcium, aluminum, barium, strontium, lead, phosphorus) are added individually or in a mixture so as to constitute a fraction by weight that is less than 20%.

In an improved variant implementation, said silica grains are densified in an oven by the following heat treatment:
 temperature rise from 20° C. to 800° C. under oxygen at a rate lying in the range 300° C. per hour to 500° C. per hour; and
 temperature rise from 800° C. to a temperature T lying in the range 1250° C. to 1350° C. under an atmosphere of helium, with an isothermal pause for 1 hour to 5 hours at the temperature T, the density of the silica grains at the end of the heat treatment being about 2.2 $g/cm^3$.

In addition, in order to eliminate OH groups, an intermediate phase at 800° C. may be provided in said heat treatment, with treatment under chlorine or thionyl chloride for a period of time lying in the range 0.5 hours to 2 hours, followed by treatment at around 1000° C. to 1200° C. for about 1 hour under oxygen or a mixture of helium and oxygen for the purpose of eliminating the Cl groups.

During the second stage of the heat treatment, it is also possible to mix a fluorine-containing gas with the helium, said gas being selected from $SiF_4$, $CCl_2F_2$, HF, $SF_6$, and $NF_3$, so as to incorporate 0.1% to 3% fluorine in said grains The grain densification treatments defined above make it possible to increase their deposition rate on a primary preform using the POD method.

BRIEF DESCRIPTION OF THE DRAWING

The FIGURE illustrates the method of manufacturing a silica powder by a sol-gel technique according to the present invention.

DESCRIPTION OF EXAMPLES

Other characteristics and advantages of the present invention appear from the following description of examples given by way of non-limiting illustration.

EXAMPLE 1

A suspension of 70 kg of silica was made in 30 kg of deionized water. The silica was pyrogenic silica of the Aerosil OX-50 type sold by Degussa having a specific area of 50 $m^2/g$.

The pH of the suspension was 3. It was heated to 40° C., thereby forming a gel which was dried under a vacuum for 8 hours in a microwave enclosure maintained at 70° C. The vacuum was about 100 mm of mercury at the beginning of drying. The microwave power was 8 kwatts at the beginning of drying and it was reduced to 1 kwatt by the end of drying.

A cake was obtained that had been dried very uniformly without any surface crust.

It was broken up by means of a helical screw rotating at a speed lying in the range 10 revolutions per minute (r.p.m.) to 100 r.p.m.

Silica grains were obtained having diameters lying in the range 50 $\mu$m to 1 mm, grain size being centered on 300 $\mu$m. Density was 0.5 g/cm$^3$.

After screening between 100 $\mu$m and 500 $\mu$m, grains were obtained representing 70% of the initial silica.

The powder was used in a POD method plasma torch at a flow rate lying in the range 370 grams per hour (g/h) to 500 g/h. Spraying was performed on a primary preform having a diameter of 16 mm that was to be increased to 24 mm. Preform growth rate was 0.8 mm per hour and per meter, giving a material yield of 35% to 45%.

EXAMPLE 2

The powder of Example 1 was used and sprayed on a primary preform having a length of 1 meter and a diameter of 18 mm to be increased to 24 mm.

A fluorine-containing gas such as $SF_6$ was also sprayed through the torch, at a rate lying in the range 0.5 liters per minute to 3 liters per minute. At such flow rates, the percentage of fluorine incorporated in the deposited silica lay in the range 0.3% to 1.5%. Deposition speed was 0.70 mm per hour and per meter.

EXAMPLE 3

The powder of Example 1 was used and was subjected to the following densification treatment in an electric oven:

temperature rise from 20° C. to 800° C. under oxygen with temperature rising at 300° C. per hour;

heat treatment under chlorine at 800° C. for 1 hour;

temperature rise from 800° C. to 1350° C. under helium; and pause at 1350° C. for 3 hours.

After such densification, the preform rate of growth as mentioned in Example 1 increased to 3 mm per hour and per meter, with a material yield of 70% to 85%.

EXAMPLE 4

The powder of Example 1 was used and was subjected to the following densification and fluorination treatment in an electric oven:

temperature from 20° C. to 800° C. under oxygen with temperament rising at 300° C./hour;

heat treatment under an atmosphere of helium and $SiF_4$ in the range 800° C. to 1350° C.; and an isothermal pause at 1350° C. for 2 hours.

For 200 grams of silica, the flow rate of $SiF_4$ lay in the range 0.5 liters per hour to 2 liters per hour.

The percentage of incorporated fluorine was 1% by weight for an $SiF_4$ flow rate of 0.5 liters per hour with a helium flow rate of 2 liters per hour.

The above type of powder was used as the refill in a POD method applied to a preform having a length of 1 meter and a diameter of 18 mm that was to be increased to 30 mm. The silica flow rate was 0.4 kg per hour.

The deposition rate was 2.8 mm per hour and per meter. The deposited silica continued to contain 1% by weight of fluorine, corresponding to a refractive index difference $\Delta n = -5 \times 10^{-3}$ relative to pure silica. The material yield lay in the range 65% to 80%.

It should be observed that most advantageously the percentage of fluorine contained in the powder is fully retained in the deposited silica.

As shown in the FIGURE, the present invention is directed to a process having the steps of forming a suspension, gelling the suspension, drying the suspension with microwaves, breaking up the dry gel, and screening the grains.

Naturally, the invention is not limited to the implementations described above. Without going beyond the ambit of the invention, it is possible to replace any means by equivalent means.

It is claimed:

1. A method of manufacturing a silica powder by a sol-gel technique, wherein said method comprises:

forming a suspension consisting of synthetic silica soot and water, said suspension having a concentration of 50% to 75% by weight of silica, and said synthetic silica soot having a specific surface area of less than 80 m$^2$/g;

gelling said suspension;

drying and breaking up the resulting gel into grains of silica having a size lying in the range 10 $\mu$m to 1 mm and having an apparent density of about 0.5 g/cm$^3$ to 0.6 g/cm$^3$, wherein the drying is with microwaves and is in bulk, without any crust forming; and screening the grains of silica to provide grains having a desired size.

2. A method according to claim 1, wherein said gelling step comprises heating said suspension to about 40° C., and wherein said drying step comprises drying the resulting gel under a vacuum in a microwave oven, and wherein said breaking up step comprises grinding said gel using polytetrafluoroethylene balls or cutting up using a helical screw.

3. A method according to claim 1, wherein said method further comprises densifying said provided silica grains in an oven by the following heat treatment:

raising the temperature in the oven from 20° C. to 800° C. under an atmosphere comprising oxygen at a rate lying in the range of 300° C. per hour to 500° C. per hour; and raising the temperature in the oven from 800° C. to a temperature T lying in the range of 1250° C. to 1350° C., under an atmosphere comprising helium, and with an isothermal pause for 1 hour to 5 hours at the temperature T, and wherein the density of the silica grains at the end of the heat treatment is about 2.2 g/cm$^3$.

4. A method according to claim 3, wherein said method further comprises providing an intermediate stage in said heat treatment with treatment under chlorine or thionyl chloride at 800° C. for a period lying in the range of 0.5 hours to 2 hours, followed by treatment at about 1000° C. to 1200° C. for about 1 hour under an atmosphere consisting essentially of oxygen or under an atmosphere consisting essentially of a mixture of helium and oxygen, thereby eliminating Cl groups.

5. A method according to claim 3, wherein said method further comprises mixing a fluorine-containing gas with the helium, wherein said gas is selected from the group consisting of $SiF_4$, $CCl_2F_2$, HF, $SF_6$, and $NF_3$, thereby incorporating 0.1% to 3% fluorine in said grains.

6. A method of manufacturing a silica powder by a sol-gel technique, wherein said method comprises:

forming a suspension consisting of synthetic silica soot and water, said suspension having a concentration of 50% to 75% by weight of silica, and said synthetic silica soot having a specific surface area of less than 80 m$^2$/g;

gelling said suspension;

drying and breaking up the resulting gel into grains of silica having a size lying in the range 10 µm to 1 mm and having an apparent density of about 0.5 g/cm$^3$ to 0.6 g/cm$^3$, wherein the drying is with microwaves and is in bulk, without any crust forming; and screening the grains of silica to remove substantially only (1) any grains having a size below 100 µm and (2) any grains having a size above 500 µm.

7. A method of manufacturing a silica powder by a sol-gel technique, wherein said method comprises:

forming a suspension consisting of
  (a) synthetic silica soot,
  (b) at least one dopant compound which is an oxide or salt of a dopant material selected from the group consisting of titanium, magnesium, calcium, aluminum, barium, strontium, lead, and phosphorus, and
  (c) water, said suspension having a concentration of 50% to 75% by weight of silica, and said synthetic silica soot having a specific surface area of less than 80 m$^2$/g;

gelling said suspension;

drying and breaking up the resulting gel into grains of silica having a size lying in the range 10 µm to 1 mm and having an apparent density of about 0.5 g/cm$^3$ to 0.6 g/cm$^3$, wherein the drying is with microwaves and is in bulk, without any crust forming; and screening the grains of silica to provide grains having a desired size.

8. A method according to claim 7, wherein the at least one dopant is added in an amount of less than 20% by weight based on a total weight of the suspension.

9. A method of manufacturing a silica powder by a sol-gel technique, wherein said method comprises:

forming a suspension consisting of synthetic silica soot and water, said suspension having a concentration of 50% to 75% by weight of silica, and said synthetic silica soot having a specific surface area of less than 80 m$^2$/g;

gelling said suspension;

drying and breaking up the resulting gel into grains of silica having a size lying in the range 10 µm to 1 mm and having an apparent density of about 0.5 g/cm$^3$ to 0.6 g/cm$^3$, wherein the drying is with microwaves and is in bulk, without any crust forming; and screening the grains of silica to provide grains having a size between 100 µm and 500 µm.

* * * * *